United States Patent
Zadeh et al.

(10) Patent No.: US 6,516,195 B1
(45) Date of Patent: Feb. 4, 2003

(54) METHOD AND SYSTEM FOR OPTIMIZING A TELECOMMUNICATIONS UTILIZING POSITIONING INFORMATION IN NETWORK RECORDING PROGRAMS

(75) Inventors: Bagher Rouhollah Zadeh, Dallas, TX (US); Shahrokh Amirijoo, Richardson, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/312,305

(22) Filed: May 14, 1999

(51) Int. Cl.[7] .................. H04Q 7/20; H04B 17/00
(52) U.S. Cl. .................. 455/446; 455/456; 455/457; 455/423; 455/67.1
(58) Field of Search .................. 455/456, 457, 455/458, 422, 446, 423, 424, 67.1, 67.7, 435, 436, 437, 438, 439, 440, 441, 442, 443, 444

(56) References Cited

U.S. PATENT DOCUMENTS

| | | | | |
|---|---|---|---|---|
| 5,561,839 A | * | 10/1996 | Osterberg et al. | 455/446 |
| 6,081,717 A | * | 6/2000 | Shah et al. | 455/422 |
| 6,119,012 A | * | 9/2000 | Amirijoo | 455/432 |
| 2001/0041575 A1 | * | 11/2001 | Amirijoo et al. | 455/456 |
| 2002/0034952 A1 | * | 3/2002 | Hussain et al. | 455/456 |

FOREIGN PATENT DOCUMENTS

GB    2 271 486 A   *   4/1994     H04B/7/26

OTHER PUBLICATIONS

Geographic Messaging in Wireless AD HOC Networks by: Stefano Basangi, Imrich Chlamtac and Violet R. Syrotiuk. Published: IEEE 0–7803–5655–Feb, 1999.*
Handoff Techniques in Universal Mobile Communications by: Jonathan P. Castro Published: IEEE 0–7803–1396–Aug. 1993.*

* cited by examiner

Primary Examiner—Vivian Chin
Assistant Examiner—Edan Orgad

(57) ABSTRACT

A method and system for optimizing mobile telecommunications networks utilizing geographical positioning information. Initially, a particular telecommunications event, such as a handover event, call set-up event, a dropped call event, or a high bit error rate event, is designated, such that an occurrence of the particular telecommunications event automatically triggers geographical positioning of a mobile unit within a mobile telecommunications network. A geographical positioning request is then transmitted to a mobile location center within the telecommunications network, in response to an occurrence of the particular telecommunications event. Thereafter, geographical positioning information associated with the particular telecommunications event and the mobile unit is determined, in response to the transmission of the geographical positioning request to the mobile location center. The geographical positioning information is thereafter stored in a database within the mobile telecommunications network. The geographical positioning information can thereafter be analyzed in order to optimize telecommunications operations within the mobile telecommunications network.

28 Claims, 3 Drawing Sheets

METHOD AND SYSTEM FOR OPTIMIZING A TELECOMMUNICATIONS UTILIZING POSITIONING INFORMATION IN NETWORK RECORDING PROGRAMS

BACKGROUND OF THE INVENTION

1. Technical Field of the Invention

The present invention relates to wireless telecommunications networks. In particular, the present invention relates to geographical positioning methods and systems. More particularly, the present invention relates to techniques for optimizing wireless telecommunications networks utilizing geographical positioning information.

2. Description of the Related Art

Present-day mobile telephony has spurred rapid technological advances in both wireless and non-wireless areas. The telecommunications industry is a rapidly growing industry, with advances, improvements, and technological breakthroughs occurring on an almost daily basis. Many mobile telecommunications systems, among them the European GSM-system, have already passed through several basic development phases and system designers are now concentrating on further improvements to the systems, including system refinements and the introduction of optional services.

Most wireless telecommunication systems currently in use are implemented as cellular telephone networks. Cellular telephone networks typically are composed of a group of base stations connected to a centrally located switch. This centrally located switch is commonly referred to as a Mobile Switching Center (MSC). Base stations are usually spaced apart from each other by distances of between one-half and twenty kilometers. Each base station is assigned a number of two-way voice and control channels. The voice channels transmit voice signals to and from proximately located mobile stations, and transmit control information to and from these mobile stations, usually for the purpose of establishing a voice communications link.

A typical cellular telephone network also includes a group of interconnected mobile switching centers, which operate in association with a gateway mobile switching center through which the cellular telephone network interconnects with a conventional public switched telephone network (PSTN). In addition, at least one home location register (HLR) operates within the cellular telephone network. The HLR stores network subscriber information, including the identified location of current mobile stations within the network.

In response to an incoming call dialed to a mobile station, a signal is sent to the home location register requesting routing information through the network to the called mobile station. The home location register "looks up" the current location of the mobile station and contacts the currently serving mobile switching center to pre-route the call and retrieve a temporary location directory number, which is utilized to route the call through the cellular telephone network for delivery to the mobile station.

The serving mobile switching center retrieves from a visitor location register (VLR), the identification of the cell within which the called mobile station is currently located. The mobile switching center then instructs the base station associated with that particular cell to page the mobile station. Responding to the page, the mobile station requests assignment of a channel, and the network routes the call through the serving mobile switching center and over the assigned channel.

It is important to periodically optimize wireless telecommunications network functions and operations. Positioning information (e.g., geographical location of mobile units) can be utilized for wireless telecommunications network optimization and planning, such as "hot spot" detection (i.e., for micro-cells or overlaid cells), handover/cell border optimization, detection of coverage holes, and so forth. Such geographical positioning information may also be utilized by vendors to improve existing radio network functionality, such as handover algorithms. The geographical positioning information can be obtained via GPS (Geographical Positioning System), Time-of-Arrival (TOA), and other geographical positioning techniques.

Wireless telecommunications network (i.e., radio network) optimization has traditionally been accomplished manually using cell-planning tools and cell test-drives. For example, when optimizing cell plan and handover borders within wireless cellular networks, data has traditionally been gathered by driving in a car within the cell border areas and recording positioning information utilizing a GPS receiver installed in the test-drive vehicle. The recorded data is then correlated with the position provided manually by the GPS receiver. This process requires extensive cell test-drives and is known to be very tedious and costly for the network operators or optimization team. Such optimization methods typically cover only the drive route followed by the test-drive vehicle and do not provide all positioning information. Thus, such methods are limited because they can not be utilized for all coverage areas or types of radio network optimization (e.g., "hot spot" detection, detection of coverage holes or geographical information on handovers, and so forth).

From the foregoing, it can be appreciated that a need exists for a reliable method and system that would permit radio network operators or optimization teams to efficiently utilize geographical positioning information to optimize telecommunications operations and functions within radio networks. It is believed that the method and system described herein solves this problem.

SUMMARY OF THE INVENTION

It is therefore one object of the present invention to provide an improved wireless telecommunications network.

It is another object of the present invention to provide a method and system for optimizing telecommunications operations within wireless telecommunications networks.

It is still another object of the present invention to provide a method and system for efficiently optimizing and planning telecommunications operations within wireless telecommunications networks, utilizing geographical positioning information.

The above and other objects are achieved as is now described. A method and system are disclosed for optimizing mobile telecommunications networks utilizing geographical positioning information. Initially, a particular telecommunications event, such as a handover event, call set-up event, or a dropped call event, is designated, such that an occurrence of the particular telecommunications event automatically triggers geographical positioning of a mobile unit within a mobile telecommunications network. Other particular telecommunications events designated as such include high bit error rate events, wherein the bit error rate is greater than a predefined threshold. A geographical positioning request is then transmitted to a mobile location center within the telecommunications network, in response to an occurrence of the particular telecommunications event.

Thereafter, geographical positioning information associated with the particular telecommunications event and the mobile unit is determined, in response to the transmission of the geographical positioning request to the mobile location center. The geographical positioning information is thereafter stored in a database within the mobile telecommunications network. The geographical positioning information can thereafter be analyzed in order to optimize telecommunications operations within the mobile telecommunications network. The geographical positioning information can be used for network optimization, such as "hot spot" detection for micro cells overlaid cells within a cellular telecommunications network, handover and cell border optimization, and detection of coverage holes. Such geographical positioning information can also be utilized to improve network functionality, such as handover algorithms.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
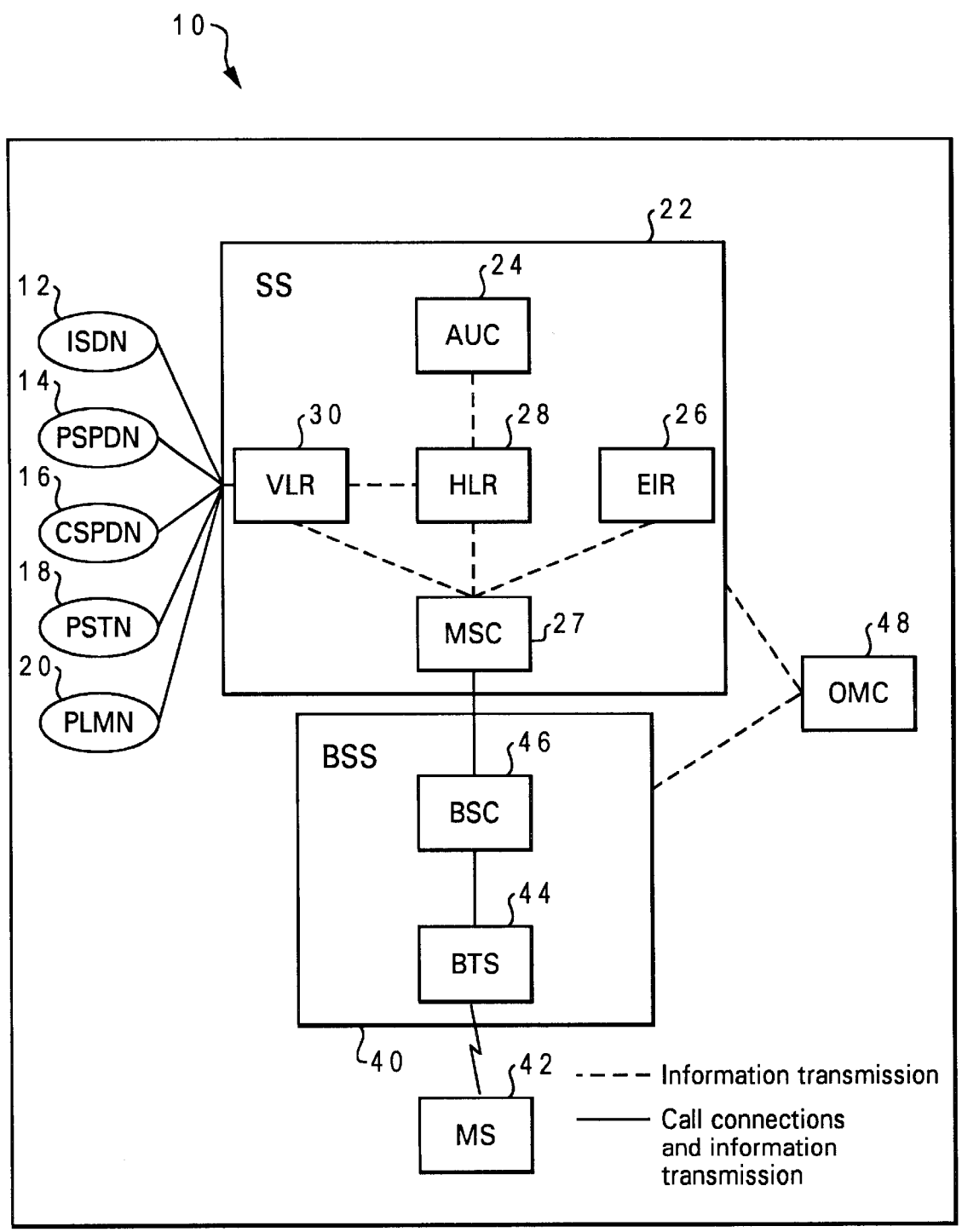
FIG. 1 depicts a block diagram illustrative of a telecommunications network in which a preferred embodiment of the present invention may be implemented.

Reference is now made to FIG. 1, wherein a telecommunications network 10 is illustrated, in accordance with a preferred embodiment of the present invention. Telecommunications network 10 is divided into a Switching System (SS) 22 and a Base Station System (BSS) 40, which each contain a number of functional units that process information and carry out telecommunication operations.

Switching System (SS) 22 is composed of a Visitor Location Register (VLR) 30, a Home Location Register (HLR) 28, an Authentication Center (AUC) 24, an Equipment Identity Register (EIR) 26, and a Mobile Switching Center (MSC) 27. Base Station System (BSS) 40 is composed of a Base Station Controller (BSC) 46 and a Base Transceiver Station (BTS) 44. An Operations and Maintenance Center (OMC) 48 is connected to equipment present within Switching System (SS) 22 and to BSC 46. The dashed lines in FIG. 1 represent information transmission, while solid lines represent both call connections and information transmission.

Telecommunications network 10 may be realized as a network of neighboring radio cells, which together provide complete coverage for a service area. The service area is the geographic area served by a given telecommunications supplier. The service area of New York Telephone, for example, is most (but not all) of New York State. Each cell contains a base station transceiver (BTS) operating on a set of radio channels. These radio channels are distinguished from channels utilized by neighboring cells so as to avoid interference.

Each base station controller (BSC) controls a group of base station transceivers. The BSC manages telecommunication functions, such as "handover" and "power control". A number of BSC's (e.g., BSC 46) are served by a mobile switching center (MSC) 27, which controls calls to and from a Public Switched Telephone Network (PSTN) 18. Telecommunications network 10 preferably includes one or more mobile switching centers (MSC) 27 which provides call set-up, routing, control and termination operations in providing telecommunication services to one or more mobile stations 42.

MSC 27 also controls calls to and from an Integrated Services Digital Network (ISDN) 12, a Public Land Mobile Network (PLMN) 20, a Circuit Switched Public Data Network (CSPDN) 16, and also, various private networks such as, for example, a Packet Switched Public Data Network (PSPDN) 14. It is understood that telecommunications network 10 may include a plurality of MSCs 27, each of which communicates with a plurality of base station systems 40. Telecommunications network 10 is illustrated in FIG. 1 as having a single MSC 27, a single BSS 40, and a single MS 42 for reasons of simplicity only.

Each unit is actively involved in implementing speech connections between Mobile Station (MS) 42 and, for example, a subscriber in a fixed network, such as PSTN 18. Because of the extreme difficulties involved in completing an MS terminated telephone call, a number of databases located within the telecommunications network keep track of Mobile Station (MS) 42. The most important of these databases is the Home Location Register (HLR) 28. When a user subscribes to a telecommunications network, such as the telecommunications network depicted in FIG. 1, the user is registered within Home Location Register (HLR) 28. Home Location Register (HLR) 28 contains subscriber information, such as supplementary services and authentication parameters.

Data describing the location of the MS (e.g., the MSC area) in which the MS presently resides, is contained within the Home Location Register (HLR) 28. The MSC area is that portion of the telecommunications network covered by a single MSC. In order to route a call to a mobile subscriber within a telecommunications network, the path through the telecommunications network is linked to the MSC in the MSC area where the subscriber is currently located. Data describing the location of the MS is thus actively altered as the MS moves from cell to cell within the telecommunications network. MS 42 sends location information, via MSC 27 and Visitor Location Register (VLR) 30, to an associated HLR, which permits MS 42 to receive calls. The Authentication Center (AUC) 24 is connected to Home Location Register (HLR) 28, and provides Home Location Register (HLR) 28 with authentication parameters and ciphering keys utilized for security purposes.

Visitor Location Register (VLR) 30 is a database that contains information regarding all mobile stations currently located in the MSC area. When MS 42 roams in a new MSC area, the VLR connected to the MSC in that particular area requests data about the MS from Home Location Register (HLR) 28. Simultaneously, Home Location Register (HLR) 28 is provided with the location of the MSC area in which MS 42 resides. If it is later desired to make a call from MS 42, Visitor Location Register (VLR) 30 will have at its disposal, all the information necessary for call set-up, without being forced to interrogate Home Location Register (HLR) 28 each time a call is made. Visitor Location Register (VLR) 30 thus functions as a distributed HLR. Visitor Location Register (VLR) 30 also contains precise information about the location of the MS in the MSC area.

If an individual subscriber within the fixed network PSTN 18 desires to make a call to a GSM subscriber, an exchange within PSTN 18 connects the call to an MSC equipped with a function commonly known as a "gateway" function. In the telecommunications arts, an MSC having a "gateway" function is commonly referred to as a Gateway MSC (GMSC). The MSC in telecommunications network 10 of FIG. 1 may be implemented as a Gateway MSC. Most MSC's within GSM telecommunications networks function as Gateway MSC's. The GMSC must find the location of the searched MS, which can be accomplished by interrogating the HLR where the MS is registered. The HLR then replies with the address of the current MSC area. Thereafter, the GMSC can re-route the call to the correct MSC. When the call reaches that MSC, the VLR will have additional information regarding the precise location of the MS. The call can then be switched through to completion.

The telecommunications network depicted in FIG. 1 may be implemented as a GSM-type network. Those skilled in the art can appreciate that although the present invention is described and illustrated in the context of a GSM network standard, the present invention may also be implemented in accordance with other standards and networks, including those utilized throughout North and South America. The GSM network standard, as discussed herein, is merely presented for illustrative purposes only and is not a limiting feature of the present invention.

One refinement to wireless systems, whether GSM-based or otherwise, is the application of positioning technologies, such as GPS (Global Positioning Satellite). GPS is based on a constellation of satellites launched by the United States government, beginning in 1978. GPS is a well-known technology that has been utilized over the last twenty years in many military and civilian applications. Thus, GPS is one of many possible positioning techniques that may be utilized in accordance with a preferred embodiment of the present invention. Other positioning techniques that may be utilized in accordance with a preferred embodiment of the present invention include positioning techniques such as Time-of-Arrival (TOA) Positioning. Any of a number of geographical positioning techniques may be utilized in accordance with a preferred embodiment of the present invention. Those skilled in the art will appreciate the present invention described herein is not limited for use with only one type of geographical positioning method.

Figure 2:
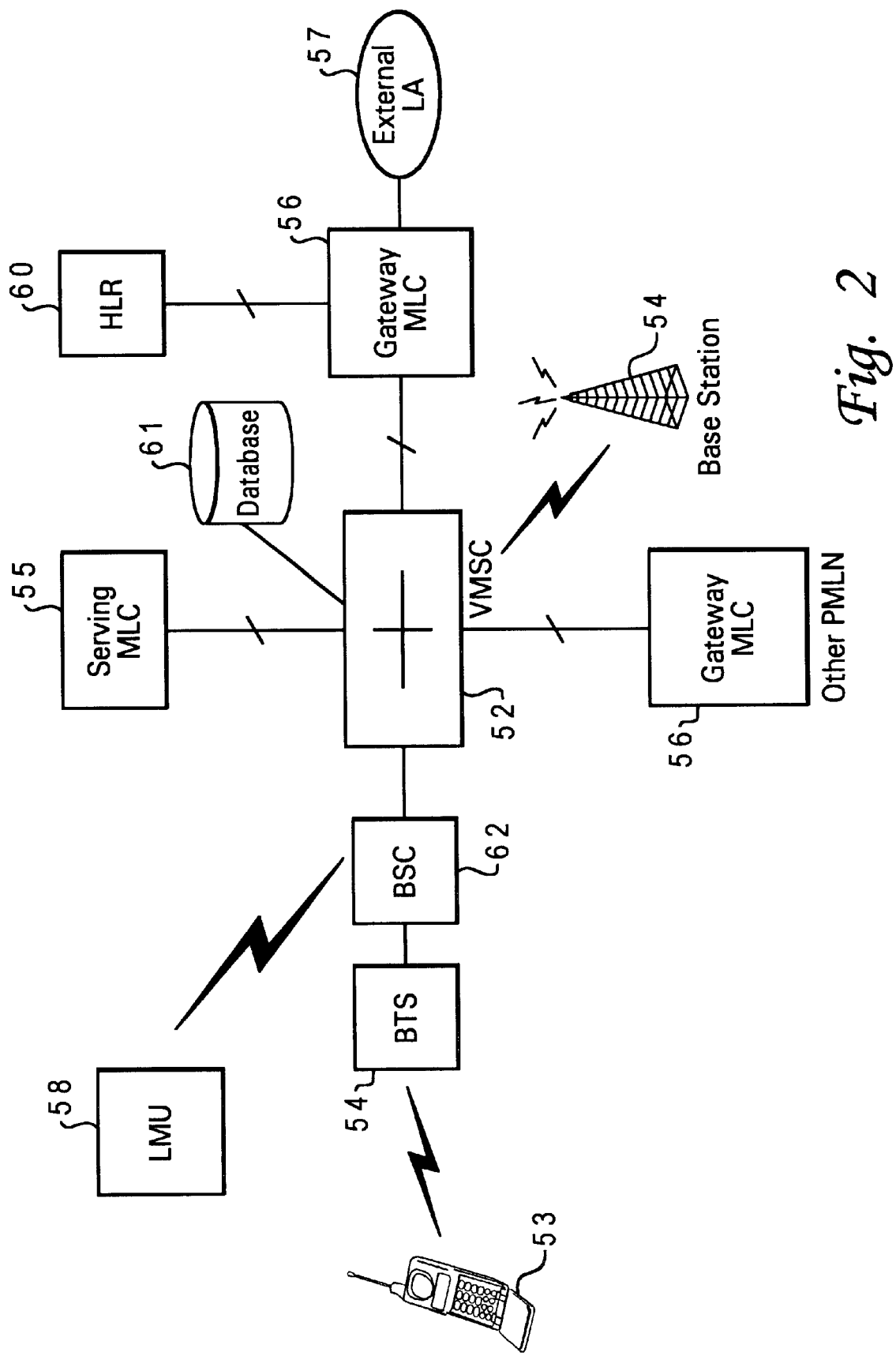
FIG. 2 depicts a block diagram of mobile location center (MLC) operations, in accordance with a preferred embodiment of the present invention.

FIG. 2 depicts a block diagram of mobile location center (MLC) operations, in accordance with a preferred embodiment of the present invention. The telecommunications network 10 of FIG. 1 preferably further includes a distinct mobile location center (MLC) associated with each MSC. FIG. 2 illustrates an MLC and associated operators, in accordance with the block diagram depicted in FIG. 1. The block diagram illustrated in FIG. 2 further defines the block diagram illustrated in FIG. 1.

The MLCs are nodes, which manage the overall coordination and scheduling of resources within telecommunications network 10 of FIG. 1 to perform mobile station positioning determinations, as explained below. An MLC in telecommunications network 10 may serve as a gateway mobile location center (GMLC) 56 which an external location area (LA) 57 may access in requesting a determination of a mobile station position. An MLC 55 serving mobile station 53 is referred to as the serving mobile location center (SMLC).

Telecommunications network 10 of FIG. 1, which incorporates the functions described in FIG. 2, preferably further includes a location measurement unit (LMU) 58, a distinct one of which is associated with each base transceiver station (BTS) 59. An LMU 58 preferably communicates with its corresponding base station 54 via the air interface so as to be capable of communicating with MSC 52 and MLC 55. MSC 52 of FIG. 2 is analogous to MSC 27 of FIG. 1. An LMU 58 preferably has its own subscription profile in home location register (HLR) 60 associated with MSC 52. HLR 60 of FIG. 2 is analogous to HLR 28 of FIG. 1. Each LMU 58 perform timing-related, radio signal measurements to support MS position determination features. The timing-related signal measurements are preferably provided to the particular MLC 55 associated therewith for facilitating MLC 55 in managing the execution of a mobile station position determination, as explained below. The communicative relationship between a base station 54, and particularly base station controller (BSC) 62, and its corresponding MSC 52 in providing conventional telecommunication services is well known in the art. BSC 62 of FIG. 2 is analogous to BSC 46 of FIG. 1. The MSC 52 may be utilized by a visiting mobile station (MS) 53 as a visiting mobile switching center (VMSC) for receiving telecommunication services. In the diagram depicted in FIG. 2, MSC 52 is referred to as a VMSC.

MLC 55 preferably accesses a database 61 having stored therein geographical information pertaining to network 10 of FIG. 1 and the associated MLC operational system described in FIG. 2. Specifically, database 61 preferably includes knowledge of the surroundings of the cell areas (not shown) served by MSC 55. Based in part upon the cell global identification (CGI) of the served cells, database 61 includes graphical information thereof, such as an indication whether each served cell is an urban cell, a suburban cell or a cell having poor radio communication capabilities.

Database 61 preferably further includes the identification and geographical location and/or distribution of each LMU 68 corresponding to the cells served by MSC 52. Database 61 is preferably accessed by a serving MLC 55 in making decisions and/or calculations regarding the determining of the position of a mobile station, such as mobile station 53 of FIG. 2 or mobile station 42 of FIG. 1 within the cells served thereby.

Serving MLC (SMLC) 55 performs a number of activities in managing the execution of a mobile station positioning operation. For example, upon receiving a request to locate a mobile station 53 having a certain degree of accuracy and/or quality of service, SMLC 55 preferably calculates the number of required access bursts for transmission by mobile station 53 during a handover portion of a TOA-based mobile station positioning operation. In addition, SMLC 55 identifies the particular LMUs 58, which are to participate in the mobile station positioning operation. Both the calculation of the required access bursts and the identification of participating LMUs 58 are based upon the cell/service area geographical information stored in database 61 in order to efficiently utilize network resources.

The obtained geographical positioning information is utilized for wireless network optimization. For example, the positioning information can be utilized for hot spot detection for micro-cells or overlaid cells (e.g., where traffic is concentrated and/or where the call is originated). In addition, the positioning information can be utilized for handover/cell border optimization, detection of coverage holes, and so forth. The positioning information can also be utilized by vendors to improve existing radio network functionality, such as, for example, handover algorithms.

To utilize the positioning information for network optimization, the positioning information is combined, according to the method and system described herein, with existing information in recording programs. The positioning information in the recording programs is achieved via the method and system described herein based on the event triggered positioning request. That is, a predefined set of events (e.g., call set-up, handover, dropped calls, high bit error rate events in which the bit error rate (BER) is above a particular threshold level, etc.) triggers a positioning request by the entity upon which the recording programs rely. For example, the recording program may rely upon an OSS (Operation and Support System), as utilized by CME 20, the Ericsson implementation of GSM.

The positioning request is sent to a mobile location center, such as the MLC's depicted in FIG. 2. This positioning request is treated by the MLC in the same manner as other commercial applications. The MLC determines the position of the mobile unit and returns the result to the application (e.g., OSS or other entities upon which the recording programs rely).

Figure 3:
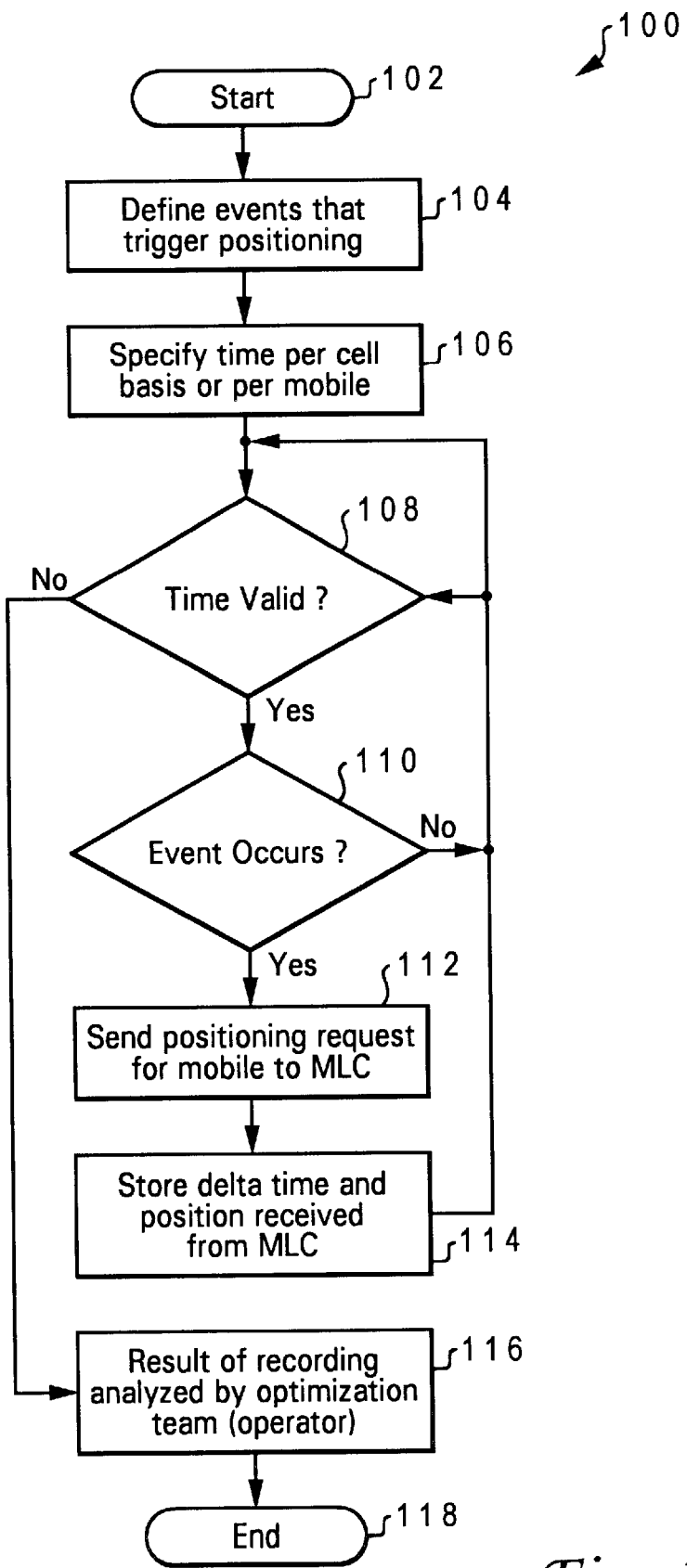
FIG. 3 depicts a logic flow diagram illustrating process steps for implementing the method and system of the present invention, in accordance with a preferred embodiment of the present invention.

FIG. 3 illustrates a high-level logic flow diagram 100 illustrating process steps for implementing the method and system of the present invention, in accordance with a preferred embodiment of the present invention. It can be appreciated by those skilled in the art that FIG. 3 presents a self-consistent sequence of steps leading to a desired result. The steps are those requiring the physical manipulation of physical quantities. Usually, although not necessarily, these quantities take the form of electrical or magnetic signals capable of being stored, transmitted, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "designating," "transmitting," "determining," "storing," or "analyzing," which are commonly associated with mental or physical operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a mobile telephone subscriber unit, instructions implementing these method steps. Such instructions can be maintained within a computer memory location of a wireless telephone base station or at a central broadcasting center from which such base stations receive instructions.

It can be appreciated by those skilled in the art that the methods described herein can be implemented as a program product (e.g., a control program residing in a computer memory) containing instructions that when executed on a CPU, carry out the operations depicted in the logic flow diagram of FIG. 3. While the present invention is described in the context of a fully functional computer system, those skilled in the art will further appreciate that the present invention is capable of being distributed as a program product in a variety of forms, and that the present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

As illustrated at block 102, the process described herein is initiated. As described thereafter at block 104, events are defined which trigger positioning. Examples of these events include dropped calls, handover failures, call set-up, high bit error rate events, and so forth. Such events, according to the invention described herein, trigger positioning from the recording programs. As indicated at block 106, these events are specified in a per cell basis or per mobile basis and for a predetermined time. As indicated at block 108, a test is performed to determine if the time is valid. If the time is valid, then the operation described at block 116 is performed.

As indicated at block 116, the result of the recording operation is analyzed by an optimization team or telecommunications network operator. This operation is described in more detail herein. If, however, the time is not valid, then the test illustrated at block 110 is performed. As described at block 110, a test is conducted to determine if one of the predefined events designated earlier via the operation described at block 104 has occurred. If the event has not occurred, then the operation described at block 108 is repeated. If, however, it is determined that a predefined event has occurred, then the process continues, as indicated at block 112.

As depicted at block 112, upon the occurrence of a pre-defined event, the entity in which the recording program resides sends a positioning request to an MLC, such as the MLC's illustrated in FIG. 2. The MLC computes the position of the MS (e.g., MS 42 of FIG. 1 or MS 53 of FIG. 2) and returns the result to the recording program, as illustrated thereafter at block 114. Note that if a geographical position has already been calculated for that particular MS and/or pre-defined event, the MLC returns that position to the recording program. For example, in the case of an event such as a call set-up, a geographical position may have already been calculated if a "home zone" application was utilized and the accuracy is sufficient for positioning purposes.

As also described at block 114, the recording program stores in the record the position associated with that particular pre-defined event. The time delay (i.e., delta time) between the occurrence of the event and calculation of position is also stored in the record. Following completion of the operation described at block 114, the operations beginning, as indicated at block 108, are repeated. When the subsequent operations are complete, the operation depicted at block 116 is performed. As illustrated at block 116, the network operation or optimization team analyzes the recording result, which contains the position for the mobile (i.e., MS) as well. The process finally terminates, as indicated at block 118.

Those skilled in the art can appreciate, based on the foregoing detailed description, that the method and system described herein presents several advantages. First, handover border optimization can be achieved without employing manual positioning data. The use of manual positioning data is a very tedious process for network operators or network optimization teams. Second, the method and system described herein permits detection of problem areas, such as coverage holes and handover failure, without employing extensive drive tests, thereby incurring costs savings. The detection of such problem areas has traditionally been a very difficult task because of the necessity of employing exhaustive drive tests within telecommunications cells or utilizing customer complaints or surveys. The method and system described herein thus permits easy detection of such problem areas, without resorting either to customer complaints and surveys or costly drive tests. Third, and finally, the method and system described herein permits the efficient implementation of detection applications, such as "hot spot" detection applications, for micro-cells or overlaid sub-cells of wireless cellular networks.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. For example, although the present invention has been described herein within the context of a GSM wireless telecommunications network, the present invention may be implemented in any of a number of different telecommunications systems. In addition, a variety of geographical positioning methods, such as GPS or Time-of-Arrival (TOA) positioning, may be utilized in accordance with the invention described and claimed herein. The description as set forth is not intended to be exhaustive or to limit the invention to the precise form disclosed. Many modifications and variations are possible in light of the above teaching without departing from the spirit and scope of the following claims.

What is claimed is:

1. A method for optimizing a mobile telecommunications network utilizing geographical positioning information stored in a database within said telecommunications network, said method comprising the steps of:

designating a plurality of telecommunications events, wherein an occurrence of one of said plurality of telecommunications events automatically triggers geographical positioning of at least one mobile unit within said mobile telecommunications network;

transmitting a geographical positioning request to a mobile location center within said telecommunications network, in response to an occurrence of one of said particular telecommunications events;

determining geographical positioning information associated with said particular telecommunications event and said at least one mobile unit, in response to transmitting said geographical positioning request to said mobile location center;

transmitting said geographical positioning information from said mobile location center to a network recording program present within said mobile telecommunications network, in response to determining said geographical positioning information;

storing said geographical positioning information in a database within said mobile telecommunications network; and analyzing said geographical positioning information stored in said database in order to optimize telecommunications operations within said mobile telecommunications network.

2. The method of claim 1, wherein said particular telecommunications event comprises a call set-up event.

3. The method of claim 1, wherein said particular telecommunications event comprises a handover event.

4. The method of claim 1, wherein said particular telecommunications event comprises a dropped call event.

5. The method of claim 1, wherein said particular telecommunications event comprises a high bit error rate event.

6. The method of claim 1, wherein the step of determining geographical positioning information associated with said particular telecommunications event and said at least one mobile unit comprises the step of:

determining said geographical positioning information utilizing a geographic positioning satellite device integrated within said at least one mobile unit.

7. The method of claim 1, wherein the step of determining geographical positioning information associated with said particular telecommunications event and said at least one mobile unit comprises the step of:

determining said geographical positioning information via Time-of-Arrival (TOA) positioning.

8. A system for optimizing a mobile telecommunications network utilizing geographical positioning information stored in a database within said telecommunications network, said system comprising:

means for designating a plurality of telecommunications events, wherein an occurrence of one of said plurality of telecommunications events automatically triggers geographical positioning of at least one mobile unit within said mobile telecommunications network;

means for transmitting a geographical positioning request to a mobile location center within said telecommunications network, in response to an occurrence of one of said particular telecommunications events;

means for determining geographical positioning information associated with said particular telecommunications event and said at least one mobile unit, in response to transmitting said geographical positioning request to said mobile location center;

means for transmitting said geographical positioning information from said mobile location center to a network recording program present within said mobile telecommunications network, in response to determining said geographical positioning information;

means for storing said geographical positioning information in a database within said mobile telecommunications network; and means for analyzing said geographical positioning information stored in said database in order to optimize telecommunications operations within said mobile telecommunications network.

9. The system of claim 8, wherein said particular telecommunications event comprises a call set-up event.

10. The system of claim 8, wherein said particular telecommunications event comprises a handover event.

11. The system of claim 8, wherein said particular telecommunications event comprises a dropped call event.

12. The system of claim 8, wherein said particular telecommunications event comprises a high bit error rate event.

13. The system of claim 8, wherein said means for determining geographical positioning information comprises a geographic positioning satellite device integrated within said at least one mobile unit.

14. The system of claim 8, wherein said means for determining geographical positioning information comprises means for determining said geographical positioning information via Time-of-Arrival (TOA) positioning.

15. A program product residing in a computer for optimizing a mobile telecommunications network utilizing geographical positioning information stored in a database within said telecommunications network, said program product comprising:

instruction means residing in a computer for designating a plurality of telecommunications events, wherein an occurrence of one of said plurality of telecommunications events automatically triggers geographical positioning of at least one mobile unit within said mobile telecommunications network;

instruction means residing in a computer for transmitting a geographical positioning request to a mobile location center within said telecommunications network, in response to an occurrence of one of said particular telecommunications events;

instruction means residing in a computer for determining geographical positioning information associated with said particular telecommunications event and said at least one mobile unit, in response to transmitting said geographical positioning request to said mobile location center;

instruction means residing in a computer for transmitting said geographical positioning information from said mobile location center to a network recording program present within said mobile telecommunications network;

instruction means residing in a computer for storing said geographical positioning information in a database within said mobile telecommunications network; and instruction means residing in a computer for analyzing said geographical positioning information stored in said database in order to optimize telecommunications operations within said mobile telecommunications network.

16. The program product of claim 15, wherein said particular telecommunications event comprises a call set-up event.

17. The program product of claim 15, wherein said particular telecommunications event comprises a handover event.

18. The program product of claim 15, wherein said particular telecommunications event comprises a dropped call event.

19. The program product of claim 15, wherein said particular telecommunications event comprises a high bit error rate event.

20. The program product of claim 15, wherein said instruction means residing in a computer for determining geographical positioning information associated with said particular telecommunications event comprises a geographic positioning satellite device integrated within said at least one mobile unit.

21. The system of claim 15, wherein said instruction means residing in a computer for determining geographical positioning information associated with said particular telecommunications event for determining said geographical positioning information via Time-of-Arrival (TOA) positioning.

22. An apparatus for optimizing a mobile telecommunications network utilizing geographical positioning information stored in a database within said telecommunications network, said apparatus comprising:

designator for designating a plurality of telecommunications events, wherein an occurrence of one of said plurality of telecommunications events automatically triggers geographical positioning of at least one mobile unit within said mobile telecommunications network;

transmitter for transmitting a geographical positioning request to a mobile location center within said telecommunications network, in response to an occurrence of one of said particular telecommunications events;

determinator for determining geographical positioning information associated with said particular telecommunications event and said at least one mobile unit, in response to transmitting said geographical positioning request to said mobile location center;

transmitter for transmitting said geographical positioning information from said mobile location center to a network recording program present within said mobile telecommunications network;

storage mechanism for storing said geographical positioning information in a database within said mobile telecommunications network; and analyzer for analyzing said geographical positioning information stored in said database in order to optimize telecommunications operations within said mobile telecommunications network.

23. The apparatus of claim 22, wherein said particular telecommunications event comprises a call set-up event.

24. The apparatus of claim 22, wherein said particular telecommunications event comprises a handover event.

25. The apparatus of claim 22, wherein said particular telecommunications event comprises a dropped call event.

26. The apparatus of claim 22, wherein said particular telecommunications event comprises a high bit error rate event.

27. The apparatus of claim 22, wherein said determinator for determining geographical positioning information associated with said particular telecommunications event comprises a geographic positioning satellite device integrated within said at least one mobile unit.

28. The apparatus of claim 22, wherein said determinator for determining geographical positioning information associated with said particular telecommunications event determines said geographical positioning information via Time-of-Arrival (TOA) positioning.

\* \* \* \* \*